(12) United States Patent
Matsuoka

(10) Patent No.: US 7,969,277 B2
(45) Date of Patent: Jun. 28, 2011

(54) NONLINEAR RESISTOR CERAMIC COMPOSITION, ELECTRONIC COMPONENT, AND MULTILAYER CHIP VARISTOR

(75) Inventor: Dai Matsuoka, Tokyo (JP)

(73) Assignee: TDK Corporation, Tokyo (JP)

( * ) Notice: Subject to any disclaimer, the term of this patent is extended or adjusted under 35 U.S.C. 154(b) by 475 days.

(21) Appl. No.: 12/169,326

(22) Filed: Jul. 8, 2008

(65) Prior Publication Data

US 2009/0015367 A1    Jan. 15, 2009

(30) Foreign Application Priority Data

Jul. 10, 2007    (JP) ................... 2007-181279

(51) Int. Cl.
*H01C 7/10* (2006.01)
(52) U.S. Cl. .......................... 338/21; 338/20
(58) Field of Classification Search ............. 338/20–21
See application file for complete search history.

(56) References Cited

U.S. PATENT DOCUMENTS 4,290,041 A * 9/1981 Utsumi et al. ............. 338/21
5,640,136 A   6/1997 Yodogawa et al.

FOREIGN PATENT DOCUMENTS

| EP | 06 17 436 A1 | 9/1994 |
| JP | A-61-43403 | 3/1986 |
| JP | A-2002-246207 | 8/2002 |
| JP | B2-3493384 | 2/2004 |

OTHER PUBLICATIONS

English language version of Chinese Office Action issued in Chinese Patent Application No. 200810128051.7, dated Jun. 23, 2010.
Oct. 8, 2009 Office Action issued in German Patent Application No. 10 2008 031 663.6 (with translation).

* cited by examiner

*Primary Examiner* — Kyung Lee
(74) *Attorney, Agent, or Firm* — Oliff & Berridge, PLC

(57) ABSTRACT

A nonlinear resistor ceramic composition has a major component containing zinc oxide, a first minor component containing an oxide of a rare-earth metal, a second minor component containing an oxide of Ca, and a third minor component containing an oxide of Si. A percentage of the second minor component to 100 moles of the major component is in the range of 2 atomic %≦the second minor component<80 atomic % in terms of Ca. A percentage of the third minor component to 100 moles of the major component is in the range of 1 atomic %≦the third minor component<40 atomic % in terms of Si. An atomic ratio of Ca to Si (Ca/Si) is not less than 1.

13 Claims, 9 Drawing Sheets

Fig.2

| Sample No. | | Minor 1 Pr at. % | Minor 4 Co at. % | Minor 5 Al at. % | Minor 6 K at. % | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|
| 1 | comparative example | 0.5 | 1.5 | 0.01 | 0.05 | 0.1 | 0.1 | 0 | 0.05 | 2 | 9.6 | 17 | 150.0 |
| 2 | comparative example | 0.5 | 1.5 | 0.01 | 0.05 | 1 | 0.1 | 0 | 0.5 | 2 | 10.8 | 17 | 135.4 |
| 3 | example | 0.5 | 1.5 | 0.01 | 0.05 | 2 | 0.1 | 0 | 1 | 2 | 11.2 | 18 | 118.0 |
| 4 | example | 0.5 | 1.5 | 0.01 | 0.05 | 5 | 0.1 | 0 | 2.5 | 2 | 11.5 | 19 | 94.4 |
| 5 | example | 0.5 | 1.5 | 0.01 | 0.05 | 10 | 0.1 | 0 | 5 | 2 | 12.3 | 17 | 86.7 |
| 6 | example | 0.5 | 1.5 | 0.01 | 0.05 | 20 | 0.1 | 0 | 10 | 2 | 13.0 | 16 | 83.9 |
| 7 | example | 0.5 | 1.5 | 0.01 | 0.05 | 30 | 0.1 | 0 | 15 | 2 | 11.5 | 21 | 69.3 |
| 8 | example | 0.5 | 1.5 | 0.01 | 0.05 | 50 | 0.1 | 0 | 25 | 2 | 15.6 | 25 | 30.6 |
| 9 | example | 0.5 | 1.5 | 0.01 | 0.05 | 70 | 0.1 | 0 | 35 | 2 | 28.0 | 16 | 10.3 |
| 10 | comparative example | 0.5 | 1.5 | 0.01 | 0.05 | 80 | 0.1 | 0 | 40 | 2 | >200 | — | — |
| 11 | comparative example | 0.5 | 1.5 | 0.01 | 0.05 | 1 | 0 | 0.1 | 0.5 | 2 | 10.3 | 16 | 140.3 |
| 12 | example | 0.5 | 1.5 | 0.01 | 0.05 | 2 | 0 | 0.1 | 1 | 2 | 11.3 | 17 | 117.6 |
| 13 | example | 0.5 | 1.5 | 0.01 | 0.05 | 5 | 0 | 0.1 | 2.5 | 2 | 11.9 | 16 | 92.0 |
| 14 | example | 0.5 | 1.5 | 0.01 | 0.05 | 10 | 0 | 0.1 | 5 | 2 | 12.3 | 18 | 85.5 |
| 15 | example | 0.5 | 1.5 | 0.01 | 0.05 | 20 | 0 | 0.1 | 10 | 2 | 12.8 | 19 | 80.9 |
| 16 | example | 0.5 | 1.5 | 0.01 | 0.05 | 30 | 0 | 0.1 | 15 | 2 | 13.6 | 20 | 66.6 |
| 17 | example | 0.5 | 1.5 | 0.01 | 0.05 | 50 | 0 | 0.1 | 25 | 2 | 14.4 | 26 | 34.6 |
| 18 | example | 0.5 | 1.5 | 0.01 | 0.05 | 70 | 0 | 0.1 | 35 | 2 | 22.9 | 16 | 12.0 |
| 19 | comparative example | 0.5 | 1.5 | 0.01 | 0.05 | 80 | 0 | 0.1 | 40 | 2 | >200 | — | — |
| 20 | example | 0.5 | 1.5 | 0.01 | 0.05 | 20 | 0.1 | 0 | 2.5 | 8 | 7.6 | 14 | 119.2 |
| 21 | example | 0.5 | 1.5 | 0.01 | 0.05 | 20 | 0.1 | 0 | 5 | 4 | 8.9 | 16 | 110.1 |
| 22 | example | 0.5 | 1.5 | 0.01 | 0.05 | 20 | 0.1 | 0 | 7.5 | 2.667 | 10.9 | 17 | 99.1 |
| 6 | example | 0.5 | 1.5 | 0.01 | 0.05 | 20 | 0.1 | 0 | 10 | 2 | 13.0 | 16 | 83.9 |
| 23 | example | 0.5 | 1.5 | 0.01 | 0.05 | 20 | 0.1 | 0 | 15 | 1.333 | 18.4 | 19 | 85.6 |
| 24 | example | 0.5 | 1.5 | 0.01 | 0.05 | 20 | 0.1 | 0 | 20 | 1 | 26.4 | 24 | 78.5 |
| 25 | comparative example | 0.5 | 1.5 | 0.01 | 0.05 | 20 | 0.1 | 0 | 25 | 0.8 | 0.3 | 1 | — |
| 26 | example | 0.5 | 1.5 | 0.01 | 0.05 | 20 | 0 | 0.1 | 2.5 | 8 | 8.0 | 12 | 110.3 |
| 27 | example | 0.5 | 1.5 | 0.01 | 0.05 | 20 | 0 | 0.1 | 5 | 4 | 9.6 | 14 | 105.5 |
| 28 | example | 0.5 | 1.5 | 0.01 | 0.05 | 20 | 0 | 0.1 | 7.5 | 2.667 | 11.1 | 18 | 95.0 |
| 15 | example | 0.5 | 1.5 | 0.01 | 0.05 | 20 | 0 | 0.1 | 10 | 2 | 12.8 | 19 | 80.9 |
| 27 | example | 0.5 | 1.5 | 0.01 | 0.05 | 20 | 0 | 0.1 | 15 | 1.333 | 16.5 | 19 | 82.2 |
| 28 | example | 0.5 | 1.5 | 0.01 | 0.05 | 20 | 0 | 0.1 | 20 | 1 | 26.6 | 20 | 80.8 |
| 29 | comparative example | 0.5 | 1.5 | 0.01 | 0.05 | 20 | 0 | 0.1 | 25 | 0.8 | 0.2 | 1 | — |

The contents are those relative to 100 moles of the major component (ZnO).

Fig.3

| Sample No. | | Minor 1 Pr at. % | Minor 4 Co at. % | Minor 5 Al at. % | Minor 6 K at. % | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|
| 30 | comparative example | 0.01 | 1.5 | 0.01 | 0.05 | 20 | 0.1 | 0 | 10 | 2 | Low Limit | — | — |
| 31 | example | 0.05 | 1.5 | 0.01 | 0.05 | 20 | 0.1 | 0 | 10 | 2 | 8.8 | 14 | 90.1 |
| 32 | example | 0.1 | 1.5 | 0.01 | 0.05 | 20 | 0.1 | 0 | 10 | 2 | 12.7 | 15 | 88.4 |
| 6 | example | 0.5 | 1.5 | 0.01 | 0.05 | 20 | 0.1 | 0 | 10 | 2 | 13.0 | 16 | 83.9 |
| 33 | example | 1 | 1.5 | 0.01 | 0.05 | 20 | 0.1 | 0 | 10 | 2 | 17.0 | 17 | 83.2 |
| 34 | example | 5 | 1.5 | 0.01 | 0.05 | 20 | 0.1 | 0 | 10 | 2 | 43.1 | 18 | 84.2 |
| 35 | comparative example | 10 | 1.5 | 0.01 | 0.05 | 20 | 0.1 | 0 | 10 | 2 | >200 | — | — |
| 36 | comparative example | 0.01 | 1.5 | 0.01 | 0.05 | 20 | 0 | 0.1 | 10 | 2 | Low Limit | — | — |
| 37 | example | 0.05 | 1.5 | 0.01 | 0.05 | 20 | 0 | 0.1 | 10 | 2 | 8.4 | 14 | 89.1 |
| 38 | example | 0.1 | 1.5 | 0.01 | 0.05 | 20 | 0 | 0.1 | 10 | 2 | 12.2 | 15 | 86.3 |
| 15 | example | 0.5 | 1.5 | 0.01 | 0.05 | 20 | 0 | 0.1 | 10 | 2 | 12.8 | 19 | 80.9 |
| 39 | example | 1 | 1.5 | 0.01 | 0.05 | 20 | 0 | 0.1 | 10 | 2 | 17.9 | 17 | 85.3 |
| 40 | example | 5 | 1.5 | 0.01 | 0.05 | 20 | 0 | 0.1 | 10 | 2 | 42.9 | 18 | 84.4 |
| 41 | comparative example | 10 | 1.5 | 0.01 | 0.05 | 20 | 0 | 0.1 | 10 | 2 | >200 | — | — |

The contents are those relative to 100 moles of the major component (ZnO).

Fig.4

| Sample No. | | Minor 1 rare-earth element kind | Minor 1 at. % | Minor 4 Co at. % | Minor 5 Al at. % | Minor 6 K at. % | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|---|
| 42 | example | Y | 0.5 | 1.5 | 0.01 | 0.05 | 20 | 0.1 | 0 | 10 | 2 | 15.3 | 15 | 80.1 |
| 43 | example | La | 0.5 | 1.5 | 0.01 | 0.05 | 20 | 0.1 | 0 | 10 | 2 | 14.9 | 14 | 78.8 |
| 44 | example | Ce | 0.5 | 1.5 | 0.01 | 0.05 | 20 | 0.1 | 0 | 10 | 2 | 14.2 | 13 | 83.3 |
| 6 | example | Pr | 0.5 | 1.5 | 0.01 | 0.05 | 20 | 0.1 | 0 | 10 | 2 | 13.0 | 16 | 83.9 |
| 45 | example | Nd | 0.5 | 1.5 | 0.01 | 0.05 | 20 | 0.1 | 0 | 10 | 2 | 16.4 | 17 | 78.8 |
| 46 | example | Sm | 0.5 | 1.5 | 0.01 | 0.05 | 20 | 0.1 | 0 | 10 | 2 | 17.2 | 18 | 79.5 |
| 47 | example | Eu | 0.5 | 1.5 | 0.01 | 0.05 | 20 | 0.1 | 0 | 10 | 2 | 14.7 | 15 | 82.0 |
| 48 | example | Gd | 0.5 | 1.5 | 0.01 | 0.05 | 20 | 0.1 | 0 | 10 | 2 | 15.6 | 17 | 83.3 |
| 49 | example | Tb | 0.5 | 1.5 | 0.01 | 0.05 | 20 | 0.1 | 0 | 10 | 2 | 14.2 | 16 | 82.0 |
| 50 | example | Dy | 0.5 | 1.5 | 0.01 | 0.05 | 20 | 0.1 | 0 | 10 | 2 | 14.5 | 14 | 85.2 |
| 51 | example | Ho | 0.5 | 1.5 | 0.01 | 0.05 | 20 | 0.1 | 0 | 10 | 2 | 14.7 | 14 | 81.4 |
| 52 | example | Er | 0.5 | 1.5 | 0.01 | 0.05 | 20 | 0.1 | 0 | 10 | 2 | 16.1 | 17 | 83.3 |
| 53 | example | Tm | 0.5 | 1.5 | 0.01 | 0.05 | 20 | 0.1 | 0 | 10 | 2 | 14.9 | 14 | 85.8 |
| 54 | example | Yb | 0.5 | 1.5 | 0.01 | 0.05 | 20 | 0.1 | 0 | 10 | 2 | 15.8 | 18 | 89.6 |
| 55 | example | Lu | 0.5 | 1.5 | 0.01 | 0.05 | 20 | 0.1 | 0 | 10 | 2 | 16.7 | 18 | 82.0 |
| 56 | example | Y | 0.5 | 1.5 | 0.01 | 0.05 | 20 | 0 | 0.1 | 10 | 2 | 15.0 | 18 | 77.2 |
| 57 | example | La | 0.5 | 1.5 | 0.01 | 0.05 | 20 | 0 | 0.1 | 10 | 2 | 14.7 | 17 | 76.0 |
| 58 | example | Ce | 0.5 | 1.5 | 0.01 | 0.05 | 20 | 0 | 0.1 | 10 | 2 | 13.9 | 15 | 80.3 |
| 15 | example | Pr | 0.5 | 1.5 | 0.01 | 0.05 | 20 | 0 | 0.1 | 10 | 2 | 12.8 | 19 | 80.9 |
| 59 | example | Nd | 0.5 | 1.5 | 0.01 | 0.05 | 20 | 0 | 0.1 | 10 | 2 | 16.1 | 20 | 76.0 |
| 60 | example | Sm | 0.5 | 1.5 | 0.01 | 0.05 | 20 | 0 | 0.1 | 10 | 2 | 16.9 | 21 | 76.6 |
| 61 | example | Eu | 0.5 | 1.5 | 0.01 | 0.05 | 20 | 0 | 0.1 | 10 | 2 | 14.4 | 18 | 79.1 |
| 62 | example | Gd | 0.5 | 1.5 | 0.01 | 0.05 | 20 | 0 | 0.1 | 10 | 2 | 15.4 | 20 | 80.3 |
| 63 | example | Tb | 0.5 | 1.5 | 0.01 | 0.05 | 20 | 0 | 0.1 | 10 | 2 | 14.0 | 19 | 79.1 |
| 64 | example | Dy | 0.5 | 1.5 | 0.01 | 0.05 | 20 | 0 | 0.1 | 10 | 2 | 14.2 | 17 | 82.1 |
| 65 | example | Ho | 0.5 | 1.5 | 0.01 | 0.05 | 20 | 0 | 0.1 | 10 | 2 | 14.5 | 17 | 78.4 |
| 66 | example | Er | 0.5 | 1.5 | 0.01 | 0.05 | 20 | 0 | 0.1 | 10 | 2 | 15.8 | 20 | 80.3 |
| 67 | example | Tm | 0.5 | 1.5 | 0.01 | 0.05 | 20 | 0 | 0.1 | 10 | 2 | 14.7 | 17 | 82.7 |
| 68 | example | Yb | 0.5 | 1.5 | 0.01 | 0.05 | 20 | 0 | 0.1 | 10 | 2 | 15.5 | 21 | 86.4 |
| 69 | example | Lu | 0.5 | 1.5 | 0.01 | 0.05 | 20 | 0 | 0.1 | 10 | 2 | 16.5 | 22 | 79.1 |

The contents are those relative to 100 moles of the major component (ZnO).

Fig.5

| Sample No. | | Minor 1 Pr at. % | Minor 4 Co at. % | Minor 5 Al at. % | Minor 6 K at. % | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|
| 70 | comparative example | 0.5 | 0.05 | 0.01 | 0.05 | 20 | 0.1 | 0 | 10 | 2 | Low Limit | — | — |
| 71 | example | 0.5 | 0.1 | 0.01 | 0.05 | 20 | 0.1 | 0 | 10 | 2 | 4.8 | 6 | 112.2 |
| 72 | example | 0.5 | 0.5 | 0.01 | 0.05 | 20 | 0.1 | 0 | 10 | 2 | 6.7 | 7 | 90.5 |
| 73 | example | 0.5 | 1 | 0.01 | 0.05 | 20 | 0.1 | 0 | 10 | 2 | 13.1 | 14 | 85.2 |
| 6 | example | 0.5 | 1.5 | 0.01 | 0.05 | 20 | 0.1 | 0 | 10 | 2 | 13.0 | 16 | 83.9 |
| 74 | example | 0.5 | 2 | 0.01 | 0.05 | 20 | 0.1 | 0 | 10 | 2 | 13.3 | 18 | 82.3 |
| 75 | example | 0.5 | 3 | 0.01 | 0.05 | 20 | 0.1 | 0 | 10 | 2 | 15.6 | 19 | 78.3 |
| 76 | example | 0.5 | 10 | 0.01 | 0.05 | 20 | 0.1 | 0 | 10 | 2 | 50.1 | 4 | 69.8 |
| 77 | comparative example | 0.5 | 0.05 | 0.01 | 0.05 | 20 | 0 | 0.1 | 10 | 2 | Low Limit | — | — |
| 78 | example | 0.5 | 0.1 | 0.01 | 0.05 | 20 | 0 | 0.1 | 10 | 2 | 5.6 | 7 | 110.9 |
| 79 | example | 0.5 | 0.5 | 0.01 | 0.05 | 20 | 0 | 0.1 | 10 | 2 | 7.4 | 8 | 97.7 |
| 80 | example | 0.5 | 1 | 0.01 | 0.05 | 20 | 0 | 0.1 | 10 | 2 | 12.5 | 13 | 85.6 |
| 15 | example | 0.5 | 1.5 | 0.01 | 0.05 | 20 | 0 | 0.1 | 10 | 2 | 12.8 | 19 | 80.9 |
| 81 | example | 0.5 | 2 | 0.01 | 0.05 | 20 | 0 | 0.1 | 10 | 2 | 13.6 | 16 | 88.8 |
| 82 | example | 0.5 | 3 | 0.01 | 0.05 | 20 | 0 | 0.1 | 10 | 2 | 16.6 | 18 | 87.6 |
| 83 | example | 0.5 | 10 | 0.01 | 0.05 | 20 | 0 | 0.1 | 10 | 2 | 49.4 | 3 | 67.3 |

The contents are those relative to 100 moles of the major component (ZnO).

Fig.6

| Sample No. | | Minor 1 Pr at. % | Minor 4 Co at. % | Minor 5 Group IIIB element | | | | Minor 6 K at. % | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|---|---|---|
| | | | | B at. % | Al at. % | Ga at. % | In at. % | | | | | | | | | |
| 84 | comparative example | 0.5 | 1.5 | 0 | 0 | 0 | 0 | 0.05 | 20 | 0.1 | 0 | 10 | 2 | >200 | — | — |
| 85 | example | 0.5 | 1.5 | 0 | 0.0001 | 0 | 0 | 0.05 | 20 | 0.1 | 0 | 10 | 2 | 42.8 | 9 | 60.9 |
| 86 | example | 0.5 | 1.5 | 0 | 0.0005 | 0 | 0 | 0.05 | 20 | 0.1 | 0 | 10 | 2 | 17.8 | 15 | 81.0 |
| 87 | example | 0.5 | 1.5 | 0 | 0.001 | 0 | 0 | 0.05 | 20 | 0.1 | 0 | 10 | 2 | 13.0 | 15 | 82.9 |
| 88 | example | 0.5 | 1.5 | 0 | 0.005 | 0 | 0 | 0.05 | 20 | 0.1 | 0 | 10 | 2 | 23.8 | 9 | 70.0 |
| 6 | example | 0.5 | 1.5 | 0.01 | 0 | 0 | 0 | 0.05 | 20 | 0.1 | 0 | 10 | 2 | 13.0 | 16 | 83.9 |
| 89 | example | 0.5 | 1.5 | 0 | 0.01 | 0 | 0 | 0.05 | 20 | 0.1 | 0 | 10 | 2 | 10.3 | 11 | 81.3 |
| 90 | example | 0.5 | 1.5 | 0 | 0 | 0.01 | 0 | 0.05 | 20 | 0.1 | 0 | 10 | 2 | 9.7 | 12 | 78.2 |
| 91 | example | 0.5 | 1.5 | 0 | 0.01 | 0.01 | 0 | 0.05 | 20 | 0.1 | 0 | 10 | 2 | 10.5 | 8 | 84.6 |
| 92 | example | 0.5 | 1.5 | 0 | 0.01 | 0 | 0.01 | 0.05 | 20 | 0.1 | 0 | 10 | 2 | 10.1 | 9 | 82.3 |
| 93 | example | 0.5 | 1.5 | 0 | 0 | 0.01 | 0.01 | 0.05 | 20 | 0.1 | 0 | 10 | 2 | 10.2 | 9 | 82.9 |
| 94 | example | 0.5 | 1.5 | 0 | 0.05 | 0 | 0 | 0.05 | 20 | 0.1 | 0 | 10 | 2 | 13.2 | 16 | 85.4 |
| 95 | example | 0.5 | 1.5 | 0 | 0.1 | 0 | 0 | 0.05 | 20 | 0.1 | 0 | 10 | 2 | 10.4 | 14 | 87.2 |
| 96 | example | 0.5 | 1.5 | 0 | 0.5 | 0 | 0 | 0.05 | 20 | 0.1 | 0 | 10 | 2 | 6.9 | 8 | 105.2 |
| 97 | comparative example | 0.5 | 1.5 | 0 | 1 | 0 | 0 | 0.05 | 20 | 0.1 | 0 | 10 | 2 | Low Limit | — | — |
| 98 | comparative example | 0.5 | 1.5 | 0 | 0.0001 | 0 | 0 | 0.05 | 20 | 0 | 0.1 | 10 | 2 | >200 | — | — |
| 99 | example | 0.5 | 1.5 | 0 | 0.0005 | 0 | 0 | 0.05 | 20 | 0 | 0.1 | 10 | 2 | 49.5 | 9 | 54.1 |
| 100 | example | 0.5 | 1.5 | 0 | 0.001 | 0 | 0 | 0.05 | 20 | 0 | 0.1 | 10 | 2 | 17.7 | 14 | 77.8 |
| 101 | example | 0.5 | 1.5 | 0 | 0 | 0.01 | 0.01 | 0.05 | 20 | 0 | 0.1 | 10 | 2 | 15.8 | 15 | 81.1 |
| 102 | example | 0.5 | 1.5 | 0 | 0 | 0 | 0.01 | 0.05 | 20 | 0 | 0.1 | 10 | 2 | 14.4 | 7 | 71.3 |
| 15 | example | 0.5 | 1.5 | 0 | 0.005 | 0 | 0 | 0.05 | 20 | 0 | 0.1 | 10 | 2 | 12.8 | 19 | 80.9 |
| 103 | example | 0.5 | 1.5 | 0 | 0.01 | 0 | 0 | 0.05 | 20 | 0 | 0.1 | 10 | 2 | 9.2 | 13 | 81.7 |
| 104 | example | 0.5 | 1.5 | 0 | 0 | 0 | 0.01 | 0.05 | 20 | 0 | 0.1 | 10 | 2 | 10.7 | 10 | 85.9 |
| 105 | example | 0.5 | 1.5 | 0 | 0.01 | 0.01 | 0 | 0.05 | 20 | 0 | 0.1 | 10 | 2 | 11.0 | 8 | 83.3 |
| 106 | example | 0.5 | 1.5 | 0 | 0.01 | 0 | 0.01 | 0.05 | 20 | 0 | 0.1 | 10 | 2 | 9.7 | 9 | 81.6 |
| 107 | example | 0.5 | 1.5 | 0 | 0.01 | 0 | 0.01 | 0.05 | 20 | 0 | 0.1 | 10 | 2 | 9.1 | 7 | 84.5 |
| 108 | example | 0.5 | 1.5 | 0 | 0.05 | 0 | 0 | 0.05 | 20 | 0 | 0.1 | 10 | 2 | 11.6 | 14 | 89.2 |
| 109 | example | 0.5 | 1.5 | 0 | 0.1 | 0 | 0 | 0.05 | 20 | 0 | 0.1 | 10 | 2 | 9.8 | 11 | 94.8 |
| 110 | example | 0.5 | 1.5 | 0 | 0.5 | 0 | 0 | 0.05 | 20 | 0 | 0.1 | 10 | 2 | 5.8 | 9 | 107.2 |
| 111 | comparative example | 0.5 | 1.5 | 0 | 1 | 0 | 0 | 0.05 | 20 | 0 | 0.1 | 10 | 2 | Low Limit | — | — |

The contents are those relative to 100 moles of the major component (ZnO).

Fig.7

| Sample No. | | Minor 1 Pr at. % | Minor 4 Co at. % | Minor 5 Al at. % | Minor 6 Group I A element | | | | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|---|---|---|
| | | | | | Na at. % | K at. % | Rb at. % | Cs at. % | | | | | | | | |
| 112 | example | 0.5 | 1.5 | 0.01 | 0 | 0 | 0 | 0 | 20 | 0.1 | 0 | 10 | 2 | 11.1 | 9 | 93.0 |
| 113 | example | 0.5 | 1.5 | 0.01 | 0 | 0.01 | 0 | 0 | 20 | 0.1 | 0 | 10 | 2 | 12.3 | 12 | 90.2 |
| 114 | example | 0.5 | 1.5 | 0.01 | 0 | 0.03 | 0 | 0 | 20 | 0.1 | 0 | 10 | 2 | 15.6 | 13 | 86.6 |
| 115 | example | 0.5 | 1.5 | 0.01 | 0.05 | 0 | 0 | 0 | 20 | 0.1 | 0 | 10 | 2 | 14.7 | 15 | 79.4 |
| 6 | example | 0.5 | 1.5 | 0.01 | 0 | 0.05 | 0 | 0 | 20 | 0.1 | 0 | 10 | 2 | 13.0 | 16 | 83.9 |
| 116 | example | 0.5 | 1.5 | 0.01 | 0 | 0 | 0.05 | 0 | 20 | 0.1 | 0 | 10 | 2 | 7.2 | 11 | 82.4 |
| 117 | example | 0.5 | 1.5 | 0.01 | 0 | 0 | 0 | 0.05 | 20 | 0.1 | 0 | 10 | 2 | 6.6 | 12 | 82.9 |
| 118 | example | 0.5 | 1.5 | 0.01 | 0.025 | 0.025 | 0 | 0 | 20 | 0.1 | 0 | 10 | 2 | 13.3 | 18 | 87.4 |
| 119 | example | 0.5 | 1.5 | 0.01 | 0.025 | 0 | 0.025 | 0 | 20 | 0.1 | 0 | 10 | 2 | 13.9 | 16 | 85.9 |
| 120 | example | 0.5 | 1.5 | 0.01 | 0.025 | 0 | 0 | 0.025 | 20 | 0.1 | 0 | 10 | 2 | 11.4 | 14 | 88.9 |
| 121 | example | 0.5 | 1.5 | 0.01 | 0 | 0.025 | 0.025 | 0 | 20 | 0.1 | 0 | 10 | 2 | 10.6 | 17 | 83.3 |
| 122 | example | 0.5 | 1.5 | 0.01 | 0 | 0.025 | 0 | 0.025 | 20 | 0.1 | 0 | 10 | 2 | 12.6 | 18 | 82.2 |
| 123 | example | 0.5 | 1.5 | 0.01 | 0 | 0 | 0.025 | 0.025 | 20 | 0.1 | 0 | 10 | 2 | 11.0 | 14 | 80.4 |
| 124 | example | 0.5 | 1.5 | 0.01 | 0 | 0.1 | 0 | 0 | 20 | 0.1 | 0 | 10 | 2 | 32.9 | 17 | 81.9 |
| 125 | example | 0.5 | 1.5 | 0.01 | 0 | 1 | 0 | 0 | 20 | 0.1 | 0 | 10 | 2 | 45.2 | 12 | 84.1 |
| 126 | comparative example | 0.5 | 1.5 | 0.01 | 0 | 5 | 0 | 0 | 20 | 0.1 | 0 | 10 | 2 | Melt | – | – |
| 127 | example | 0.5 | 1.5 | 0.01 | 0 | 0 | 0 | 0 | 20 | 0 | 0.1 | 10 | 2 | 10.6 | 9 | 95.3 |
| 128 | example | 0.5 | 1.5 | 0.01 | 0 | 0.01 | 0 | 0 | 20 | 0 | 0.1 | 10 | 2 | 9.5 | 7 | 98.2 |
| 129 | example | 0.5 | 1.5 | 0.01 | 0 | 0.03 | 0 | 0 | 20 | 0 | 0.1 | 10 | 2 | 15.1 | 11 | 85.6 |
| 130 | example | 0.5 | 1.5 | 0.01 | 0.05 | 0 | 0 | 0 | 20 | 0 | 0.1 | 10 | 2 | 13.8 | 18 | 81.1 |
| 15 | example | 0.5 | 1.5 | 0.01 | 0 | 0.05 | 0 | 0 | 20 | 0 | 0.1 | 10 | 2 | 12.8 | 19 | 80.9 |
| 131 | example | 0.5 | 1.5 | 0.01 | 0 | 0 | 0.05 | 0 | 20 | 0 | 0.1 | 10 | 2 | 8.0 | 11 | 80.1 |
| 132 | example | 0.5 | 1.5 | 0.01 | 0 | 0 | 0 | 0.05 | 20 | 0 | 0.1 | 10 | 2 | 6.7 | 12 | 81.0 |
| 133 | example | 0.5 | 1.5 | 0.01 | 0.025 | 0.025 | 0 | 0 | 20 | 0 | 0.1 | 10 | 2 | 14.8 | 16 | 82.9 |
| 134 | example | 0.5 | 1.5 | 0.01 | 0.025 | 0 | 0.025 | 0 | 20 | 0 | 0.1 | 10 | 2 | 14.4 | 16 | 81.8 |
| 135 | example | 0.5 | 1.5 | 0.01 | 0.025 | 0 | 0 | 0.025 | 20 | 0 | 0.1 | 10 | 2 | 12.3 | 14 | 79.5 |
| 136 | example | 0.5 | 1.5 | 0.01 | 0 | 0.025 | 0.025 | 0 | 20 | 0 | 0.1 | 10 | 2 | 11.5 | 15 | 83.3 |
| 137 | example | 0.5 | 1.5 | 0.01 | 0 | 0.025 | 0 | 0.025 | 20 | 0 | 0.1 | 10 | 2 | 12.9 | 15 | 79.3 |
| 138 | example | 0.5 | 1.5 | 0.01 | 0 | 0 | 0.025 | 0.025 | 20 | 0 | 0.1 | 10 | 2 | 11.1 | 14 | 74.9 |
| 139 | example | 0.5 | 1.5 | 0.01 | 0 | 0.1 | 0 | 0 | 20 | 0 | 0.1 | 10 | 2 | 24.0 | 16 | 86.1 |
| 140 | example | 0.5 | 1.5 | 0.01 | 0 | 1 | 0 | 0 | 20 | 0 | 0.1 | 10 | 2 | 29.1 | 11 | 93.1 |
| 141 | comparative example | 0.5 | 1.5 | 0.01 | 0 | 5 | 0 | 0 | 20 | 0 | 0.1 | 10 | 2 | Melt | – | – |

The contents are those relative to 100 moles of the major component (ZnO).

Fig.8

| Sample No. | | Minor 1 Pr at. % | Minor 4 Co at. % | Minor 5 Al at. % | Minor 6 K at. % | Minor 2 Ca at. % | Minor 7 Group IIA element except Ca | | | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|---|---|---|
| | | | | | | | Mg at. % | Sr at. % | Ba at. % | | | | | | | |
| 142 | example | 0.5 | 1.5 | 0.01 | 0.05 | 19 | 1 | 0 | 0 | 0.1 | 0 | 10 | 1.9 | 11.7 | 17 | 86.2 |
| 6 | example | 0.5 | 1.5 | 0.01 | 0.05 | 20 | 0 | 0 | 0 | 0.1 | 0 | 10 | 2 | 13.0 | 16 | 83.9 |
| 143 | example | 0.5 | 1.5 | 0.01 | 0.05 | 19 | 0 | 1 | 0 | 0.1 | 0 | 10 | 1.9 | 12.8 | 15 | 82.6 |
| 144 | example | 0.5 | 1.5 | 0.01 | 0.05 | 19 | 0 | 0 | 1 | 0.1 | 0 | 10 | 1.9 | 11.9 | 16 | 81.3 |
| 145 | example | 0.5 | 1.5 | 0.01 | 0.05 | 50 | 0 | 0 | 0 | 0.1 | 0 | 10 | 5 | 17.6 | 11 | 85.8 |
| 146 | comparative example | 0.5 | 1.5 | 0.01 | 0.05 | 100 | 0 | 0 | 0 | 0.1 | 0 | 10 | 10 | >200 | — | — |
| 147 | example | 0.5 | 1.5 | 0.01 | 0.05 | 19 | 1 | 0 | 0 | 0 | 0.1 | 10 | 1.9 | 12.8 | 14 | 82.9 |
| 15 | example | 0.5 | 1.5 | 0.01 | 0.05 | 20 | 0 | 0 | 0 | 0 | 0.1 | 10 | 2 | 12.8 | 19 | 80.9 |
| 148 | example | 0.5 | 1.5 | 0.01 | 0.05 | 19 | 0 | 1 | 0 | 0 | 0.1 | 10 | 1.9 | 13.1 | 15 | 83.2 |
| 149 | example | 0.5 | 1.5 | 0.01 | 0.05 | 19 | 0 | 0 | 1 | 0 | 0.1 | 10 | 1.9 | 11.8 | 14 | 81.6 |
| 150 | example | 0.5 | 1.5 | 0.01 | 0.05 | 50 | 0 | 0 | 0 | 0 | 0.1 | 10 | 5 | 19.9 | 11 | 87.1 |
| 151 | comparative example | 0.5 | 1.5 | 0.01 | 0.05 | 100 | 0 | 0 | 0 | 0 | 0.1 | 10 | 10 | >200 | — | — |

The contents are those relative to 100 moles of the major component (ZnO).

Fig.9

| Sample No. | | Minor 1 Pr at. % | Minor 4 Co at. % | Minor 5 Al at. % | Minor 6 K at. % | Minor 2 Ca at. % | Minor 8 Cr at. % | Minor 8 Mo at. % | Minor 3 Si at. % | Ca/Si | Varistor voltage V1mA | Nonlinear coefficient α | CV product C*V1mA |
|---|---|---|---|---|---|---|---|---|---|---|---|---|---|
| 152 | example | 0.5 | 1.5 | 0.01 | 0.05 | 20 | 0 | 0 | 10 | 2 | 10.0 | 11 | 83.9 |
| 153 | example | 0.5 | 1.5 | 0.01 | 0.05 | 20 | 0.001 | 0 | 10 | 2 | 10.2 | 17 | 84.9 |
| 154 | example | 0.5 | 1.5 | 0.01 | 0.05 | 20 | 0.005 | 0 | 10 | 2 | 10.5 | 18 | 83.4 |
| 155 | example | 0.5 | 1.5 | 0.01 | 0.05 | 20 | 0.01 | 0 | 10 | 2 | 10.8 | 17 | 82.6 |
| 6 | example | 0.5 | 1.5 | 0.01 | 0.05 | 20 | 0.1 | 0 | 10 | 2 | 13.0 | 16 | 83.9 |
| 156 | example | 0.5 | 1.5 | 0.01 | 0.05 | 20 | 1 | 0 | 10 | 2 | 15.8 | 15 | 82.9 |
| 157 | example | 0.5 | 1.5 | 0.01 | 0.05 | 20 | 2 | 0 | 10 | 2 | 18.5 | 12 | 75.9 |
| 158 | comparative example | 0.5 | 1.5 | 0.01 | 0.05 | 20 | 10 | 0 | 10 | 2 | >200 | — | — |
| 159 | example | 0.5 | 1.5 | 0.01 | 0.05 | 20 | 0 | 0.001 | 10 | 2 | 9.6 | 14 | 85.6 |
| 160 | example | 0.5 | 1.5 | 0.01 | 0.05 | 20 | 0 | 0.005 | 10 | 2 | 9.9 | 16 | 84.1 |
| 161 | example | 0.5 | 1.5 | 0.01 | 0.05 | 20 | 0 | 0.01 | 10 | 2 | 10.3 | 17 | 86.8 |
| 15 | example | 0.5 | 1.5 | 0.01 | 0.05 | 20 | 0 | 0.1 | 10 | 2 | 12.8 | 19 | 80.9 |
| 162 | example | 0.5 | 1.5 | 0.01 | 0.05 | 20 | 0 | 1 | 10 | 2 | 15.2 | 14 | 81.4 |
| 163 | example | 0.5 | 1.5 | 0.01 | 0.05 | 20 | 0 | 2 | 10 | 2 | 18.3 | 11 | 80.8 |
| 164 | comparative example | 0.5 | 1.5 | 0.01 | 0.05 | 20 | 0 | 10 | 10 | 2 | >200 | — | — |
| 165 | example | 0.5 | 1.5 | 0.01 | 0.05 | 20 | 0.01 | 0.01 | 10 | 2 | 9.4 | 10 | 72.2 |

The contents are those relative to 100 moles of the major component (ZnO).

NONLINEAR RESISTOR CERAMIC COMPOSITION, ELECTRONIC COMPONENT, AND MULTILAYER CHIP VARISTOR

BACKGROUND OF THE INVENTION

1. Field of the Invention

The present invention relates to a nonlinear resistor ceramic composition, an electronic component using the nonlinear resistor ceramic composition as a nonlinear resistor layer, and a multilayer chip varistor.

2. Related Background Art

A multilayer chip varistor as an example of an electronic component having a nonlinear resistor layer is used, for example, for absorbing or removing an exogenous surge (abnormal voltage) such as static electricity, noise, and so on (e.g., of. Patent Document: Japanese Patent Application Laid-open No. 2002-246207). Patent Document 1 discloses a nonlinear resistor ceramic composition containing zinc oxide as a major component and the following additives as minor components: a Pr compound 0.05-3.00 atomic % in terms of Pr; a Co compound 0.1-5.0 atomic % in terms of Co; a Cr compound 0.01-0.50 atomic % in terms of Cr; at least one of an Al compound, a Ga compound, and an In compound 0.001-0.020 atomic % in terms of Al, Ga, and In, respectively; a Si compound 0.001-0.500 atomic % in terms of Si; and a Ca compound+a Sr compound 0.01-0.50 atomic % in terms of Ca+Sr (provided that Ca/Sr is 0-50).

SUMMARY OF THE INVENTION

With recent increase in operating speed and transmission speed of digital signals, there are desires for a low-capacitance multilayer chip varistor causing less influence on signals.

An object of the present invention is therefore to provide a nonlinear resistor ceramic composition, an electronic component, and a multilayer chip varistor capable of achieving a low capacitance while maintaining good nonlinear voltage-current characteristics.

The inventors conducted elaborate research on the nonlinear resistor ceramic composition and multilayer chip varistor capable of achieving a low capacitance while maintaining good nonlinear voltage-current characteristics, and found the fact as described below.

In general, the capacitance of a varistor is represented by the following formula:

$$C = \epsilon_0 \epsilon_r (S/d) \quad (1),$$

where C is the capacitance, $\epsilon_0$ the permittivity of vacuum, $\epsilon_r$ the relative permittivity, S the area of opposed electrodes where the capacitance is established, and d the thickness between the opposed electrodes. In the case where the varistor contains zinc oxide (ZnO) as a major component, i.e., in the case of a ZnO-based varistor, care should be taken when handling the thickness d. The ZnO-based varistor exhibits its characteristics by virtue of crystal grain boundaries. Namely, there is a large difference in a steady state between the resistance of grain boundaries and the intragranular resistance, and the resistance of grain boundaries is much larger than the intragranular resistance. In the steady state under a breakdown voltage (rise voltage), therefore, an applied electric field is almost entirely exerted on the grain boundaries. The aforementioned thickness d should thus be one taking this point into consideration.

The thickness d is expressed by the following equation:

$$d = n \cdot 2W \quad (2),$$

where n is the number of grain boundaries parallel to the opposed electrodes and 2W is a width of a depletion layer of one grain boundary.

The following relation holds between varistor voltage $V_{1\,mA}$ and the number n of grain boundaries:

$$n = V_{1\,mA}/\phi \quad (3),$$

where $\phi$ is a barrier height of grain boundary, which is a value representing a varistor voltage per grain boundary.

By substituting Eq (2) and Eq (3) into Eq (1) and modifying the resultant equation, we obtain the following relation:

$$C \cdot V_{1\,mA} = \epsilon_0 \epsilon_r \cdot (\phi \cdot S/2W) \quad (4).$$

With appropriate nonlinear voltage-current characteristics, $\phi$ and 2W take certain fixed values (e.g., $\phi$ is approximately 0.8 eV and 2W approximately 30 nm). Therefore, where the area S of the opposed electrodes is constant, Eq (4) is constant. Conversely, in order to reduce the capacitance while maintaining appropriate nonlinear voltage-current characteristics, it is effective to reduce the area S of the opposed electrodes.

A conceivable technique for reducing the area S of the opposed electrodes is to directly decrease the area of the opposed electrodes. However, if the area of the opposed electrodes is simply decreased, it will result in decreasing the maximum energy and surge current capacity, so as to degrade the nonlinear voltage-current characteristics, the reliability of the device, and so on. It is thus considered that a good way for minimizing the degradation of maximum energy and surge current capacity and also decreasing the capacitance is to control the microstructure of ceramic. Namely, the area of crystal grain boundaries of zinc oxide where the capacitance is established between the opposed electrodes is decreased by introducing a second phase consisting of an oxide except for zinc oxide into a first phase consisting essentially of zinc oxide and controlling the volume fraction of the second phase. This makes it feasible to decrease the capacitance, without decrease in the area of the opposed electrodes.

In light of the above-described research result, a nonlinear resistor ceramic composition according to the present invention is a nonlinear resistor ceramic composition comprising: a major component containing zinc oxide; a first minor component containing an oxide of a rare-earth metal; a second minor component containing an oxide of Ca; and a third minor component containing an oxide of Si; wherein a percentage of the second minor component to 100 moles of the major component is in the range of 2 atomic %≦ the second minor component<80 atomic % in terms of Ca; wherein a percentage of the third minor component to 100 moles of the major component is in the range of 1 atomic %≦the third minor component<40 atomic % in terms of Si; and wherein an atomic ratio of Ca to Si (Ca/Si) is not less than 1.

Since the nonlinear resistor ceramic composition according to the present invention comprises the major component containing zinc oxide and the first minor component containing the oxide of the rare-earth metal, it exhibits nonlinear voltage-current characteristics. Since the composition has the constitution wherein the percentage of the second minor component to 100 moles of the major component is in the range of 2 atomic %≦the second minor component<80 atomic % in terms of Ca, wherein the percentage of the third minor component to 100 moles of the major component is in the range of 1 atomic %≦the third minor component<40 atomic % in terms of Si, and wherein the atomic ratio of Ca to Si (Ca/Si) is not less than 1, it comes to have a crystal structure wherein the second phase consisting of a composite oxide (e.g., $CaSiO_3$, $Ca_2SiO_4$, or the like) synthesized by reaction between Ca and Si is introduced into the first phase mainly containing zinc oxide and wherein the volume fraction of the second phase is controlled to a desired value. Therefore, the area of crystal grain boundaries of zinc oxide becomes smaller. The composite oxide of Ca and Si has the permittivity smaller than that of zinc oxide, and does not inhibit development of nonlinear voltage-current characteristics. As a result of these, the capacitance to be established in the nonlinear resistor ceramic composition can be made smaller.

Incidentally, it is also possible to decrease the area of crystal grain boundaries of zinc oxide and thereby to decrease the capacitance to be established in the nonlinear resistor ceramic composition, by composing the second phase of a composite oxide (e.g., $Zn_2SiO_4$) synthesized by reaction between the major component containing zinc oxide, and Si. However, the composite oxide of Zn and Si is thermally unstable, and there is thus a possibility that the composite oxide of Zn and Si could be combined with zinc oxide to produce $SiO_x$ and resultant $SiO_x$ could precipitate in the crystal grain boundaries of zinc oxide. This $SiO_x$ has a property to inhibit the nonlinear voltage-current characteristics and, therefore, when the second phase is composed of the composite oxide of Zn and Si, it becomes difficult to maintain good nonlinear voltage-current characteristics. In contrast to it, the composite oxide synthesized by reaction of Ca and Si in the present invention, such as $CaSiO_3$ or $Ca_2SiO_4$, is thermally stable and the possibility of production of $SiO_x$ to inhibit the nonlinear voltage-current characteristics is extremely low; therefore, good nonlinear voltage-current characteristics can be maintained.

Preferably, the oxide of the rare-earth metal contained in the first minor component is an oxide of at least one selected from Y, La, Ce, Pr, Nd, Sm, Eu, Gd, Tb, Dy, Ho, Er, Tm, Yb, and Lu, and a percentage of the first minor component to 100 moles of the major component is in the range of 0.01 atomic %<the first minor component<10 atomic % in terms of the selected rare-earth element. If the percentage of the first minor component is too low, development of nonlinear voltage-current characteristics tends to become difficult. If the percentage is too high, the varistor voltage tends to rise sharply.

More preferably, the oxide of the rare-earth metal contained in the first minor component is an oxide of Pr.

Preferably, the composition further comprises a fourth minor component containing an oxide of Co, and a percentage of the fourth minor component to 100 moles of the major component is in the range of 0.05 atomic %<the fourth minor component<10 atomic % in terms of Co. If the percentage of the fourth minor component is too low, it tends to become difficult to achieve a desired varistor voltage. If the percentage is too high, the varistor voltage tends to increase and the nonlinear voltage-current characteristics tend to degrade.

Preferably, the composition further comprises a fifth minor component containing an oxide of at least one selected from Group IIIB elements, and a percentage of the fifth minor component to 100 moles of the major component is in the range of 0.0005 atomic %≦the fifth minor component≦0.5 atomic % in terms of the selected Group IIIB element. If the percentage of the fifth minor component is too low, the varistor voltage tends to increase. If the percentage is too high, the resistance tends to become low and the varistor voltage tends not to be achieved.

More preferably, the Group IIIB elements are B, Al, Ga, and In.

Preferably, the composition further comprises a sixth minor component containing an oxide of at least one selected from Group IA elements, and a percentage of the sixth minor component to 100 moles of the major component is in the range of the sixth minor component<5 atomic % in terms of the selected Group IA element. If the percentage of the sixth minor component is too high, the melting point as a ceramic tends to decrease and the composition tends to melt during firing.

More preferably, the Group IA elements are Na, K, Rb, and Cs.

Preferably, the composition further comprises a seventh minor component containing an oxide of at least one selected from Group IIA elements except for Ca, and a percentage of the seventh minor component to 100 moles of the major component is in the range of the seventh minor component<1 atomic % in terms of the selected Group IIA element. If the percentage of the seventh minor component is too high, the varistor voltage tends to increase.

More preferably, the Group IIA elements are Mg, Sr, and Ba.

Preferably, the composition further comprises an eighth minor component containing an oxide of at least one selected from Cr and Mo, and a percentage of the eighth minor component to 100 moles of the major component is in the range of the eighth minor component<10 atomic % in terms of each of Cr and Mo. If the percentage of the eighth minor component is too high, the varistor voltage tends to increase.

An electronic component according to the present invention is an electronic component having a nonlinear resistor layer, wherein the nonlinear resistor layer is comprised of the above-described nonlinear resistor ceramic composition.

A multilayer chip varistor according to the present invention is a multilayer chip varistor having a nonlinear resistor layer, wherein the nonlinear resistor layer is comprised of the above-described nonlinear resistor ceramic composition.

Each of these electronic component and multilayer chip varistor according to the present invention is one capable of achieving a reduced capacitance while maintaining good nonlinear voltage-current characteristics, as described above.

The present invention successfully provides the nonlinear resistor ceramic composition, electronic component, and multilayer chip varistor capable of achieving a low capacitance while maintaining good nonlinear voltage-current characteristics.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 to FIG. 9 are tables showing the measurement results of varistor voltage, nonlinear coefficient, and CV product in examples and comparative examples.

DESCRIPTION OF THE PREFERRED EMBODIMENTS

Figure 1:
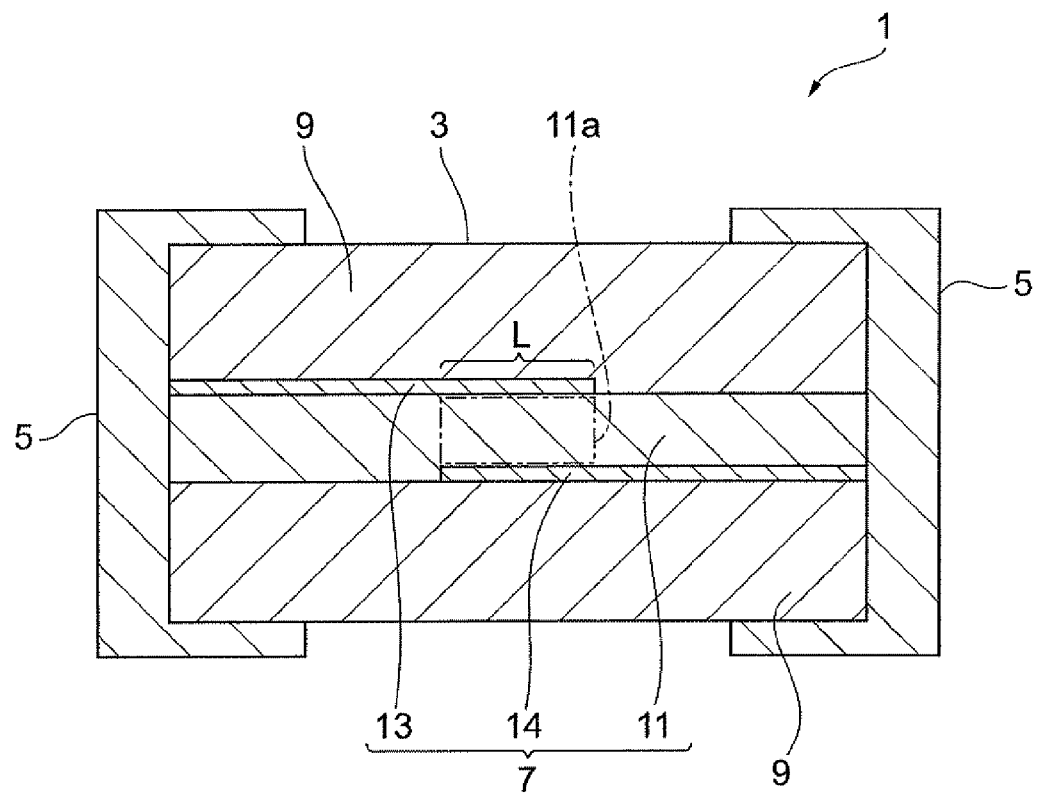
FIG. 1 is a drawing to illustrate a sectional configuration of a multilayer chip varistor according to an embodiment of the present invention.

The preferred embodiments of the present invention will be described below in detail with reference to the accompanying drawings. In the description the same elements or elements with the same functionality will be denoted by the same reference symbols, without redundant description.

First, a configuration of a multilayer chip varistor 1 according to an embodiment of the present invention will be described with reference to FIG. 1. FIG. 1 is a drawing to illustrate a sectional configuration of the multilayer chip varistor according to the present embodiment.

The multilayer chip varistor 1, as shown in FIG. 1, has a varistor element body 3, and a pair of external electrodes 5 formed on opposed end faces in the varistor element body 3. The varistor element body 3 has a varistor portion 7, and a pair of outer layer portions 9 arranged to sandwich the varistor portion 7, and is constructed in a structure in which the varistor portion 7 and the pair of outer layer portions 9 are laminated. The varistor element body 3 is of a nearly rectangular parallelepiped shape.

The varistor portion 7 includes a nonlinear resistor layer (which will be referred to hereinafter as a varistor layer) 11 to exhibit nonlinear voltage-current characteristics (which will be referred to hereinafter as a varistor characteristic), and a pair of internal electrodes 13, 14 arranged as opposed so as to sandwich the varistor layer 11. In the varistor portion 7, the varistor layer 11 and the internal electrodes 13, 14 are alternately laminated. A region 11$a$ of the varistor layer 11 overlapping with the pair of internal electrodes 13, 14 functions as a region to exhibit the varistor characteristic.

The varistor layer 11 is composed of a nonlinear resistor ceramic composition described below.

The nonlinear resistor ceramic composition forming the varistor layer 11 has a major component containing zinc oxide (ZnO). The major component containing ZnO acts as a substance to exhibit an excellent varistor characteristic and a large surge current capacity.

The nonlinear resistor ceramic composition further has a first minor component containing an oxide of a rare-earth element. The first minor component has a property unlikely to react with an electroconductive material forming the internal electrodes 13, 14, and acts as a substance to increase a diffusion rate of oxygen into crystal grain boundaries. As this is added, it is unlikely to react with the electroconductive material (particularly, Pd) forming the internal electrodes 13, 14, and as a result, it is feasible to achieve sufficient sintering of materials forming the nonlinear resistor ceramic composition.

The oxide of the rare-earth element contained in the first minor component is preferably an oxide of at least one selected from Y, La, Ce, Pr, Nd, Sm, Lu, Gd, Tb, Dy, Ho, Er, Tm, Yb, and Lu except for Sc and Pm, and more preferably at least an oxide of Pr. There are no particular restrictions on a percentage of the first minor component to 100 moles of the major component, but, in terms of the rare-earth element, it is preferably in the range of 0.01 atomic %<the first minor component<10 atomic % and more preferably in the range of 0.05 atomic %≦the first minor component≦5 atomic %. When the percentage of the first minor component is set in the foregoing predetermined range, it is feasible to maintain the composition in a semiconducting state and to increase the diffusion rate of oxygen into crystal grain boundaries.

The nonlinear resistor ceramic composition further has a second minor component containing an oxide of Ca and a third minor component containing an oxide of Si. The second minor component and the third minor component act as substances to decrease the capacitance to be developed in the nonlinear resistor ceramic composition (varistor layer 11).

A percentage of the second minor component to 100 moles of the major component is in the range of 2 atomic %≦the second minor component<80 atomic % in terms of Ca. A percentage of the third minor component to 100 moles of the major component is in the range of 1 atomic %≦the third minor component<40 atomic % in terms of Si. An atomic ratio of Ca to Si (Ca/Si) is not less than 1.

When the percentages of the second and third minor components and the atomic ratio of Ca to Si are set in the aforementioned predetermined ranges, Ca and Si react to produce a composite oxide (e.g., $CaSiO_3$, $Ca_2SiO_4$, or the like). The composite oxide of Ca and Si makes a second phase different from a first phase mainly containing ZnO, and is present at crystal grain boundaries of ZnO. A volume fraction of the second phase becomes controlled at a desired value. Therefore, the area of crystal grain boundaries of ZnO becomes smaller. The relative permittivity of the composite oxide of Ca and Si is approximately 4 and smaller than the relative permittivity of zinc oxide (about 8). The composite oxide of Ca and Si does not inhibit development of nonlinear voltage-current characteristics. As a result of these, the capacitance to be developed in the nonlinear resistor ceramic composition becomes smaller.

The percentage of the second minor component is preferably in the range of 5 atomic %≦the second minor component≦50 atomic % and more preferably in the range of 5 atomic %≦the second minor component≦30 atomic %. If the percentage of the second minor component is too high, the varistor voltage tends to increase and the nonlinear voltage-current characteristics tend to degrade. If the percentage is too low, the aforementioned effect of reduction of capacitance cannot be expected.

The percentage of the third minor component is preferably in the range of 2.5 atomic %≦the third minor component ≦25 atomic % and more preferably in the range of 2.5 atomic %≦the third minor component≦15 atomic %. If the percentage of the third minor component is too high, the varistor voltage tends to increase and the composition tends to fail in sintering. If the percentage is too low, the aforementioned effect of reduction of capacitance cannot be expected.

The atomic ratio of Ca to Si is preferably in the range of not less than 1.3 nor more than 5 and more preferably in the range of not less than 2 nor more than 2.7. In this case, the composite oxide of Ca and Si is produced more certainly and the volume fraction thereof can also be controlled more certainly at a desired value.

The aforementioned second phase exists in a state of crystal grains, and the crystal grains are preferably those uniformly distributed. A varistor such as a multilayer chip varistor absorbs electric energy such as a surge from the outside, by converting it into thermal energy. Therefore, when the crystal grains (second phase) are uniformly distributed, heat generated at the crystal grain boundaries of ZnO upon absorption of a surge can be dispersed into the crystal grains (second phase) to prevent the temperature of the crystal grain boundaries of ZnO from becoming too high.

Incidentally, with recent decrease in circuit voltage, there are desires for her reduction in the varistor voltage. Since the varistor characteristic is exhibited at the crystal grain boundaries of ZnO, it is necessary to decrease the number of crystal grain boundaries of ZnO present between the internal electrodes 13, 14 arranged as opposed, in order to decrease the varistor voltage. However, if the number of crystal grain boundaries of ZnO present between the internal electrodes 13, 14 is simply decreased, the number of crystal grain boundaries electrically connected in series will decrease, which could cause an increase in capacitance. In contrast to it, the aforementioned nonlinear resistor ceramic composition is able to suppress the increase in capacitance and make a balance between decrease of the varistor voltage and decrease of the capacitance even if the varistor voltage is lowered by decreasing the number of crystal grain boundaries of ZnO.

The nonlinear resistor ceramic composition preferably further has a fourth minor component containing an oxide of Co. The fourth minor component acts as a substance to form an acceptor level at the crystal grain boundaries of ZnO and to effect development of the varistor characteristic. A percentage of the fourth minor component to 100 moles of the major component is preferably in the range of 0.05 atomic %<the fourth minor component<10 atomic % and more preferably in the range of 0.5 atomic %≦the fourth minor component≦3 atomic % in terms of Co. If the percentage of the fourth minor component is too low, it tends to become difficult to achieve the varistor characteristic. If the percentage is too high, the varistor voltage tends to increase and the varistor characteristic tends to degrade.

The nonlinear resistor ceramic composition preferably further has a fifth minor component containing an oxide of at least one element selected from Group IIIB elements. The fifth minor component works as a donor for controlling an amount of electrons into the major component containing ZnO, and acts as a substance to increase the amount of electrons into the major component and to bring the composition into a semiconducting state. A percentage of the fifth minor component to 100 moles of the major component is in the range of 0.0005 atomic %≦the fifth minor component≦0.5 atomic % and preferably in the range of 0.001 atomic %≦the fifth minor component≦0.5 atomic % in terms of the selected Group IIIB element. If the percentage of the fifth minor component is too low, the varistor voltage tends to increase. If the percentage is too high, it tends to become difficult to achieve the varistor characteristic. The Group IIIB elements are preferably B, Al, Ga, and In.

The nonlinear resistor ceramic composition preferably further has a sixth minor component containing an oxide of at least one element selected from Group IA elements. The sixth minor component acts as a substance to improve the varistor characteristic. A percentage of the sixth minor component to 100 moles of the major component is preferably in the range of the sixth minor component<5 atomic % and more preferably in the range of 0.025 atomic %≦the fifth minor component≦0.1 atomic % in terms of the selected Group IA element. If the percentage of the sixth minor component is too low, the electric resistance tends to become lower and the composition tends to fail in achievement of the varistor voltage. If the percentage is too high, the melting point as a ceramic tends to become lowered and the composition tends to melt during firing. The Group IA elements are preferably Na, K, Rb, and Cs.

The nonlinear resistor ceramic composition preferably further has a seventh minor component containing an oxide of at least one element selected from Group IIA elements except for Ca. The seventh minor component acts as a substance to improve the varistor characteristic. A percentage of the seventh minor component to 100 moles of the major component is preferably in the range of the seventh minor component<1 atomic % in terms of the selected Group IIA element. If the percentage of the seventh minor component is too low, the varistor characteristic tends to degrade. If the percentage is too high, the varistor voltage tends to increase. The Group IIA elements are preferably Mg, Sr, and Ba.

The nonlinear resistor ceramic composition preferably further has an eighth minor component containing an oxide of at least one selected from Cr and Mo. The eighth minor component acts as a substance to improve load characteristics at high temperatures. A percentage of the eighth minor component to 100 moles of the major component is preferably in the range of the eighth minor component<10 atomic % and more preferably in the range of 0.001 atomic %≦the eighth minor component≦1 atomic % in terms of each of Cr and Mo. If the percentage of the eighth minor component is too high, the varistor voltage tends to increase.

The nonlinear resistor ceramic composition further contains inevitably mixed impurities (which will be referred to hereinafter as inevitable impurities). The inevitable impurities include $ZrO_2$ which is mixed by abrasion of media used during mixing, and metal elements such as Na mixed from raw materials.

The outer layer portions 9 are composed of the above-described nonlinear resistor ceramic composition as the varistor layer 11 is. The outer layer portions 9 function as protecting layers for protecting the varistor portion 7. The outer layer portions 9 may be composed of a composition different from the varistor layer 11, and do not have to exhibit the varistor characteristic.

The various conditions such as the number of layers in the varistor layer 11 and the thickness thereof may be optionally determined according to a purpose and usage. In the present embodiment, the thickness of the varistor layer 11 is, for example, approximately 5-100 μm. The thickness of the outer layer portions 9 is, for example, approximately 100-500 μm.

The nonlinear coefficient (α) of the varistor layer 11 is preferably not less than 8 and more preferably not less than 10. Furthermore, in the varistor layer 11, where the capacitance is measured at a reference temperature of 25° C., a measurement frequency of 1 MHz, and an input signal level (measurement voltage) of 1 Vrms, the CV product (product of capacitance C and varistor voltage V) is normally not more than 240,000, preferably not more than 220,000, and more preferably not more than 200,000 with the area of the opposed electrodes being 1 $cm^2$.

The pair of internal electrodes 13, 14 are arranged approximately in parallel so that one ends of the respective electrodes are alternately exposed in the opposed end faces in the varistor element body 3. Each internal electrode 13, 14 is electrically connected at the one end to the external electrode 5. The internal electrodes 13, 14 contain an electroconductive material. The internal electrodes 13, 14 preferably contain Pd as the electroconductive material. In the present embodiment the internal electrodes 13, 14 are made of Pd or an Ag—Pd alloy. The thickness of the internal electrodes 13, 14 is, for example, approximately 0.5-5 μm. An area of a portion L where the internal electrodes 13, 14 overlap with each other (an overlap area of the internal electrodes 13, 14) is approximately 0.001-0.5 $mm^2$ when viewed from the lamination direction of the varistor element body 3 (the direction of thickness of the varistor layer 11).

The external electrodes 5 are provided so as to cover the two ends of the varistor element body 3. The external electrodes 5 are preferably made of a metal material that can be electrically connected well to the metal such as Pd forming the internal electrodes 13, 14. For example, Ag shows good electrical connection to the internal electrodes 13, 14 made of Pd and good adhesion to the end faces of the varistor element body 3, and thus is suitable as a material for the external electrodes. The thickness of the external electrodes 5 is normally about 10-50 μm.

For example, a Ni-plated layer (not shown) about 0.5-2 μm thick and a Sn-plated layer (not shown) about 2-6 μm thick are successively formed on the surface of each external electrode 5 so as to cover the external electrode 5. These plated layers are formed mainly for the purpose of improving the resistance to soldering heat and solderability during mounting the multilayer chip varistor 1 on a substrate or the like by solder reflow.

The below will describe an example of a production procedure of the multilayer chip varistor 1 having the above-described configuration.

In the present embodiment, the multilayer chip varistor is produced by preparing a green chip by an ordinary printing or sheet method using a paste, firing it, thereafter printing or transferring external terminal electrodes thereonto, and firing them. The production method will be specifically described below.

First, each of a paste for the varistor layer, a paste for the internal electrodes, and a paste for the external electrodes is prepared. The varistor layer 11 and outer layer portions 9 shown in FIG. 1 can be formed using the paste for the varistor layer.

The paste for the varistor layer may be an organic paint obtained by kneading a raw material of the nonlinear resistor ceramic composition with an organic vehicle, or an aqueous paint. The raw material of the nonlinear resistor ceramic composition is prepared by using a raw material for constituting the major component and raw materials for constituting the respective minor components, according to the constitution of the aforementioned nonlinear resistor ceramic composition.

The raw material for constituting the major component, used herein, is an oxide of Zn and/or a compound to become the oxide after fired.

The raw material for constituting the first minor component, used herein, is an oxide of a rare-earth element and/or a compound to become the oxide after fired.

The raw material for constituting the second minor component, used herein, is an oxide of Ca and/or a compound to become the oxide after fired.

The raw material for constituting the third minor component, used herein, is an oxide of Si and/or a compound to become the oxide after fired.

The raw material for constituting the fourth minor component, used herein, is an oxide of Co and/or a compound to become the oxide after fired.

The raw material for constituting the first minor component, used herein, is a single oxide or a composite oxide of at least one selected from oxides of Group IIIB elements (B, Al, Ga, and In) and/or compounds to become these oxides after fired.

The raw material for constituting the sixth minor component, used herein, is a single oxide or a composite oxide of at least one selected from oxides of Group IA elements (Na, K, Rb, and Cs) and/or compounds to become these oxides after fired.

The raw material for constituting the seventh minor component, used herein, is a single oxide or a composite oxide of at least one selected from oxides of Group IIA elements (Mg, Ca, Sr, and Ba) except for Ca and/or compounds to become these oxides after fired.

The raw material for constituting the eighth minor component, used herein, is a single oxide or a composite oxide of at least one selected from oxides of Cr and Mo and/or compounds to become these oxides after fired.

Examples of the compounds to become the oxides after fired include hydroxides, carbonates, nitrates, oxalates, organometallic compounds, and so on. It is a matter of course that the oxides may be used in combination with the compounds to become the oxides after fired. Contents of the respective compounds in the raw material of the nonlinear resistor ceramic composition may be determined so as to achieve the constitution of the aforementioned nonlinear resistor ceramic composition after fired. Powders of these raw materials to be used are normally those having the average particle size of about 0.3-2 μm.

The organic vehicle is a solution in which a binder is dissolved in an organic solvent. There are no particular restrictions on the binder used in the organic vehicle, but it may be optionally selected from various ordinary binders such as ethylcellulose, polyvinyl butyral, and so on. There are no particular restrictions on the organic solvent, either, but it may be optionally selected from organic solvents such as terpineol, butylcarbitol, acetone, and toluene according to a method used, such as the printing or sheet method.

The aqueous paint is a paint in which an aqueous binder, a dispersant, etc. are dissolved in water. There are no particular restrictions on the aqueous binder, but it may be optionally selected from polyvinyl alcohol, cellulose, aqueous acrylic resin, emulsion, and so on.

The paste for the internal electrode layers is prepared by kneading one of the aforementioned various electroconductive materials or various oxides, organometallic compounds, resinate, etc. to become the aforementioned electroconductive materials after fired, with the aforementioned organic vehicle. The paste for the external electrodes is also prepared in the same manner as this paste for internal electrode layers.

There are no particular restrictions on the content of the organic vehicle in each paste, but it may be an ordinary content; for example, the content of the binder is about 1-5 wt % and the content of the solvent is about 10-50 wt %. Each paste may contain an additive selected from various dispersants, plasticizers, dielectrics, insulators, etc. according to need.

When the printing method is applied, the paste for the varistor layer is printed several times in a predetermined thickness on a substrate of polyethylene terephthalate or the like to form a green layer which will become one outer layer portion 9 after fired. Next, the paste for internal electrode layers is printed in a predetermined pattern on the green layer to become the one outer layer portion 9 after fired, thereby forming an electrode pattern to become the internal electrode 14 after fired. Next, the paste for the varistor layer is printed several times in a predetermined thickness so as to cover the electrode pattern to become the internal electrode 14 after fired, thereby forming a green layer which will become the varistor layer 11 after fired.

Next, the paste for internal electrode layers is printed in a predetermined pattern on the green layer to become the varistor layer 11 after fired, thereby forming an electrode pattern which will become the internal electrode 13 after fired. The electrode patterns to become the internal electrodes 13, 14 after fired are printed so as to be exposed in the surfaces of the different ends as opposed.

Thereafter, the paste for the varistor layer is printed several times in a predetermined thickness so as to cover the electrode pattern to become the internal electrode 13 after fired, thereby forming a green layer which will become the other outer layer portion 9 after fired. Thereafter, the resultant is pressed and bonded under heat and cut in a predetermined shape to obtain a green chip.

When the sheet method is applied, a green sheet is formed using the paste for the varistor layer. The paste for internal electrode layers is printed in a predetermined pattern on the green sheet to form an electrode pattern corresponding to the internal electrode 13 or 14.

Next, the green sheets with the electrode pattern thereon and green sheets with no electrode pattern are laminated in a predetermined order to form a sheet laminate. Then the sheet laminate is pressed and bonded under heat and cut in the predetermined shape to obtain a green chip.

Next, this green chip is debindered and fired to produce a sintered body (varistor element body 3). After the firing, an alkali metal (e.g., Li, Na, or the like) may be diffused from the surface of the varistor element body 3. The outer layer portions 9 and the varistor layer 11 are integrally formed in the practical multilayer chip varistor 1 so that no border can be visually recognized between them.

The debindering process may be carried out under ordinary conditions. For example, the conditions are an air atmosphere, a temperature rise rate of about 5-300° C./hour, a retention temperature of about 180-400° C., and a temperature retention time of about 0.5-24 hours.

The firing of the green chip may be carried out under ordinary conditions. For example, the conditions are an air atmosphere, a temperature rise rate of about 50-1000° C./hour, a retention temperature of about 1000-1400° C., a temperature retention time of about 0.5-8 hours, and a cooling rate of about 50-1000° C./hour. If the retention temperature is too low, densification will be insufficient. If the retention temperature is too high, the electrodes will tend to have a break due to abnormal sintering of the internal electrodes.

The paste for external electrodes is printed or transferred onto the sintered body (varistor element body 3) thus obtained, and is then sintered to form the external electrodes 5. The conditions for the sintering of the paste for the external electrodes are, for example, 600-900° C. and about ten minutes to one hour in an air atmosphere.

The multilayer chip varistor 1 of the present embodiment produced in this manner is used, for example, for absorbing or removing an exogenous surge (abnormal voltage) such as static electricity, noise, and so on.

The above described the embodiments of the present invention, but it is noted that the present invention is by no means intended to be limited to these embodiments but can be carried out in various forms without departing from the scope of the present invention.

The above embodiment described the example of application of the present invention to the multilayer chip varistor, but the present invention is not limited to only the multilayer chip varistors, and can be applied to any electronic component (e.g., a disk varistor, a varistor composite element, or the like) having a nonlinear resistor layer composed of the above-described nonlinear resistor ceramic composition in the foregoing constitution. The composition may also contain the inevitable impurities as described above.

The present invention is not limited to the multilayer chip varistors with only a pair of internal electrodes as shown in FIG. 1. While the multilayer chip varistor 1 includes only a pair of internal electrodes, a plurality of pairs of internal electrodes may be laminated, or the multilayer chip varistor may have a structure in which a number of internal electrodes are laminated.

The present invention will be described below in further detail with examples, but it is noted that the present invention is by no means limited to these examples.

In each of the examples, the multilayer chip varistor shown in FIG. 1 was prepared as a sample, and properties thereof were evaluated. The sheet method was applied to the production procedure of the multilayer chip varistor samples and it was carried out as described below. The production procedure of the multilayer chip varistor samples by the sheet method is as described above and the description thereof is simplified herein.

First, the raw material of the major component (ZnO) and the raw materials of the first to eighth minor components were prepared in order to make the material of the nonlinear resistor ceramic composition for constituting the varistor layer. Each raw material used was one of an oxide, a carbonate, and a hydrate of a carbonate.

Next, these raw materials were mixed so that a constitution after firing became one of those shown in FIGS. 2 to 9, to 100 moles of ZnO as the major component, and an organic binder, an organic solvent, and an organic plasticizer were added thereto. Then the mixture was wet-mixed for about 20 hours with a ball mill to prepare a slurry. The slurry thus prepared was applied onto a base film of PET (polyethylene terephthalate) by the doctor blade method to make a green sheet 30 μm thick thereon. A palladium paste was printed in a desired pattern on the green sheet obtained, by screen printing, and was dried to form an electrode pattern corresponding to the internal electrode.

Next, the green sheets with the electrode pattern thereon and green sheets with no electrode pattern were laminated in a predetermined order to produce a sheet laminate. Then the sheet laminate thus produced was heated and bonded and then cut in a predetermined chip shape to obtain a green chip. The resultant green chip was debindered under the conditions of 350° C. and two hours and fired at 1200° C. in air for one hour to obtain a sintered body as a varistor element body.

Next, an electrode paste consisting primarily of Ag was applied onto the two ends of the varistor element body and sintered at 800° C. to form the terminal electrodes. Each multilayer chip varistor sample with a pair of internal electrodes was produced through these processes.

The chip size of each multilayer chip varistor sample was the 1005 size, i.e., L (length)=1.0 mm, W (width)=0.5 mm, and H (height)=0.5 mm. The area of the portion where a pair of internal electrodes overlap with each other, i.e., the overlap area of the internal electrodes was 0.05 mm$^2$. The thickness of the varistor layer was 20 μm.

The varistor voltage, nonlinear coefficient, and CV product were measured using the multilayer chip varistor samples obtained.

The varistor voltage ($V_{1\ mA}$) was measured by connecting each multilayer chip varistor sample to a dc constant-current power supply, measuring a voltage between the two electrodes of the multilayer chip varistor sample with a voltmeter, and reading an electric current flowing in the multilayer chip varistor sample, with an ammeter. Specifically, when the electric current flowing in the multilayer chip varistor sample was 1 mA, the voltage acting between the electrodes of the multilayer chip varistor sample was read with the voltmeter and the value thus read was defined as the varistor voltage. The unit was V.

The nonlinear coefficient ($\alpha$) indicates a relation of voltage and electric current between the electrodes of each multilayer chip varistor sample with a change from 1 mA to 10 mA in the electric current flowing in the multilayer chip varistor sample, and was determined according to the following equation.

$$\alpha = \log(I_{10}/I_1)/\log(V10/V1) = 1/\log(V10/V1)$$

V10 means the varistor voltage measured when the electric current $I_{10}=10$ mA is flowed in the multilayer chip varistor sample. V1 means the varistor voltage measured when the electric current $I_1=1$ mA is flowed in the multilayer chip varistor sample. The larger the nonlinear coefficient ($\alpha$), the better the varistor characteristic.

The CV product ($C*V_{1\ mA}$) was determined from the product of the varistor voltage $V_{1\ mA}$ and the capacitance (C) (in the unit of pF) measured at the reference temperature of 25° C. under the conditions of the frequency of 1 MHz and the input signal level (measurement voltage) of 1 Vrms with a digital LCR meter (4284A available from HP Co.), for each multilayer chip varistor sample.

The measurement results are presented in FIGS. 2 to 9. In each drawing, "–" means uncalculable.

FIG. 2 shows the measurement results of the varistor voltage, nonlinear coefficient, and CV product with variation in the contents of Ca and Si. Sample numbers 1, 2, 10, 11, 19, 25, and 29 are comparative examples. The CV product monotonically decreases with increase in the Ca—Si content. When sample 3 with 2 atomic % Ca and 1 atomic % Si is compared with sample 1, the CV product decreases by about 20%, which demonstrates the effect of addition of Ca and Si. The CV product further decreases with increase in the content of Ca and Si and sample 6 with 20 atomic % Ca and 10 atomic % Si showed the CV product over 40% smaller than sample 1. Sample 10 and sample 19 with 80 atomic % Ca lost nonlinearity to become insulators.

FIG. 3 shows the measurement results of the varistor voltage, nonlinear coefficient, and CV product with variation in the content of Pr as a rare-earth element. No varistor voltage was obtained with sample numbers 30 and 36 in which the content of Pr was 0.01 atomic %. With sample numbers 35 and 41 in which the content of Pr was 10 atomic %, it was confirmed that the varistor voltage suddenly increased over 200 V. With each of sample numbers 31-34 and 37-40, the CV product was small and there was no problem. It was confirmed from the results shown in FIG. 3 that the percentage of the first minor component to 100 moles of the major component was preferably in the range of 0.01 atomic %<the first minor component<10 atomic % and more preferably in the range of 0.05 atomic %≦the first minor component≦5 atomic % in terms of Pr.

FIG. 4 shows the measurement results of the varistor voltage, nonlinear coefficient, and CV product with various rare-earth elements instead of Pr. It was confirmed from the results shown in FIG. 4 that any one of the rare-earth elements could also be used.

FIG. 5 shows the measurement results of the varistor voltage, nonlinear coefficient, and CV product with variation in the content of Co. With sample numbers 70 and 77 in which the content of Co was 0.05 atomic %, no varistor voltage was obtained. With sample numbers 76 and 83 in which the content of Co was 10 atomic %, an increase in the varistor voltage and a decrease in the nonlinear coefficient were observed. With each of sample numbers 71-75 and 78-82, the CV product was small and there was no problem. It was confirmed from the results shown in FIG. 5 that the percentage of the fourth minor component to 100 moles of the major component was preferably in the range of 0.05 atomic %<the fourth minor component<10 atomic % and more preferably in the range of 0.5 atomic %≦the fourth minor component≦3 atomic % in terms of Co.

FIG. 6 shows the measurement results of the varistor voltage, nonlinear coefficient, and CV product with samples containing at least one element out of the Group IIIB elements. The Group IIIB element contained in each sample was selected from B, Al, Ga, and In. With sample numbers 84 and 98 in which the content of Al was 0.0001 atomic %, the varistor voltage suddenly increased over 200 V and became over a measurement limit. With sample numbers 97 and 111 in which the content of Al was 1 atomic %, no varistor voltage was obtained. It was confirmed that B, Ga, and In could be used instead of Al and that a combination of two or more selected from B, Al, Ga, and In could be used. It was confirmed from the results shown in FIG. 6 that the percentage of the fifth minor component to 100 moles of the major component was preferably in the range of 0.0005 atomic %≦the fifth minor component≦0.5 atomic % and more preferably in the range of 0.001 atomic %≦the fifth minor component≦0.5 atomic % in terms of the selected Group IIIB element.

FIG. 7 shows the measurement results of the varistor voltage, nonlinear coefficient, and CV product with samples containing at least one element out of the Group IA elements. The Group IA element contained in each sample was selected from Na, K, Rb, and Cs. It was confirmed that the varistor characteristic appeared even with sample numbers 112 and 127 containing none of Na, K, Rb, and Cs. In each of sample numbers 126 and 141 in which the content of K was 5 atomic %, however, the sample was in a molten state and did not allow measurement of the electric properties. It was further confirmed that Na, Rb, and Cs being other alkali metals could be used instead of K and that two or more alkali metals could be added in combination. It was confirmed from the results shown in FIG. 7 that the percentage of the sixth minor component to 100 moles of the major component was preferably in the range of the sixth minor component<5 atomic % and more preferably in the range of 0.025 atomic %≦the fifth minor component≦0.1 atomic % in terms of the selected Group IA element.

FIG. 8 shows the measurement results of the varistor voltage, nonlinear coefficient, and CV product with samples containing a Group IIA element except for Ca. The Group IIA element contained in each sample was selected from Mg, Sr, and Ba. It was confirmed that the varistor characteristic appeared even with sample numbers 145 and 150 containing none of Mg, Sr, and Ba. It was confirmed that similar results were obtained with use of any one Group IIA element out of Mg, Sr, and Ba and that the effect of inclusion could also be achieved in combination of these. It was confirmed from the results shown in FIG. 8 that the percentage of the seventh minor component to 100 moles of the major component was preferably in the range of the seventh minor component<1 atomic % in terms of the selected Group IIA element. With each of sample numbers 146 and 151 in which the content of Ca was 100 atomic %, the sample became an insulator.

FIG. 9 shows the measurement results of the varistor voltage, nonlinear coefficient, and CV product with samples containing at least one element out of Cr and Mo. The varistor voltage increases with increase in the content of Cr or Mo. With sample numbers 158 and 164 in which the content of Cr or Mo was 10 atomic %, the varistor voltage suddenly increased over 200 V and became over the measurement limit. As indicated by sample number 165, a similar effect was recognized by inclusion of Cr and Mo. It was confirmed from the results shown in FIG. 9 that the percentage of the eighth minor component to 100 moles of the major component was preferably in the range of the eighth minor component<10 atomic % and more preferably in the range of 0.001 atomic %≦the eighth minor component≦1 atomic % in terms of Cr and Mo.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A nonlinear resistor ceramic composition comprising:
a major component containing zinc oxide;
a first minor component containing an oxide of a rare-earth metal;
a second minor component containing an oxide of Ca; and
a third minor component containing an oxide of Si;
wherein a percentage of the second minor component to 100 moles of the major component is in the range of 2 atomic %≦the second minor component<80 atomic % in terms of Ca;
wherein a percentage of the third minor component to 100 moles of the major component is in the range of 1 atomic %≦the third minor component<40 atomic % in terms of Si; and
wherein an atomic ratio of Ca to Si (Ca/Si) is not less than 1; and
wherein a composite oxide synthesized by a reaction between Ca and Si makes a second phase different from a first phase mainly containing zinc oxide, and the composite oxide is present at crystal grain boundaries of the zinc oxide.

2. The nonlinear resistor ceramic composition according to claim 1, wherein the oxide of the rare-earth metal contained in the first minor component is an oxide of at least one selected from Y, La, Ce, Pr, Nd, Sm, Eu, Gd, Tb, Dy, Ho, Er, Tm, Yb, and Lu, and wherein a percentage of the first minor component to 100 moles of the major component is in the range of 0.01 atomic %<the first minor component<10 atomic % in terms of the selected rare-earth element.

3. The nonlinear resistor ceramic composition according to claim 1, wherein the oxide of the rare-earth metal contained in the first minor component is an oxide of Pr.

4. The nonlinear resistor ceramic composition according to claim 1, further comprising a fourth minor component containing an oxide of Co, wherein a percentage of the fourth minor component to 100 moles of the major component is in the range of 0.05 atomic %<the fourth minor component<10 atomic % in terms of Co.

5. The nonlinear resistor ceramic composition according to claim 1, further comprising a fifth minor component containing an oxide of at least one selected from Group IIIB elements, wherein a percentage of the fifth minor component to 100 moles of the major component is in the range of 0.0005 atomic %≦the fifth minor component≦0.5 atomic % in terms of the selected Group IIIB element.

6. The nonlinear resistor ceramic composition according to claim 5, wherein the Group IIIB elements are B, Al, Ga, and In.

7. The nonlinear resistor ceramic composition according to claim 1, further comprising a sixth minor component containing an oxide of at least one selected from Group IA elements, wherein a percentage of the sixth minor component to 100 moles of the major component is in the range of the sixth minor component<5 atomic % in terms of the selected Group IA element.

8. The nonlinear resistor ceramic composition according to claim 7, wherein the Group IA elements are Na, K, Rb, and Cs.

9. The nonlinear resistor ceramic composition according to claim 1, further comprising a seventh minor component containing an oxide of at least one selected from Group IIA elements except for Ca, wherein a percentage of the seventh minor component to 100 moles of the major component is in the range of the seventh minor component<1 atomic % in terms of the selected Group IIA element.

10. The nonlinear resistor ceramic composition according to claim 9, wherein the Group IIA elements are Mg, Sr, and Ba.

11. The nonlinear resistor ceramic composition according to claim 1, further comprising an eighth minor component containing an oxide of at least one selected from Cr and Mo, wherein a percentage of the eighth minor component to 100 moles of the major component is in the range of the eighth minor component<10 atomic % in terms of each of Cr and Mo.

12. An electronic component comprising a nonlinear resistor layer, wherein the nonlinear resistor layer is comprised of a nonlinear resistor ceramic composition comprising:
a major component containing zinc oxide;
a first minor component containing an oxide of a rare-earth metal;
a second minor component containing an oxide of Ca; and
a third minor component containing an oxide of Si;
wherein a percentage of the second minor component to 100 moles of the major component is in the range of 2 atomic %≦the second minor component<80 atomic % in terms of Ca;
wherein a percentage of the third minor component to 100 moles of the major component is in the range of 1 atomic %≦the third minor component<40 atomic % in terms of Si; and
wherein an atomic ratio of Ca to Si (Ca/Si) is not less than 1; and
wherein a composite oxide synthesized by a reaction between Ca and Si makes a second phase different from a first phase mainly containing zinc oxide, and the composite oxide is present at crystal grain boundaries of the zinc oxide.

13. A multilayer chip varistor comprising a nonlinear resistor layer, wherein the nonlinear resistor layer is comprised of a nonlinear resistor ceramic composition comprising:
a major component containing zinc oxide;
a first minor component containing an oxide of a rare-earth metal;
a second minor component containing an oxide of Ca; and
a third minor component containing an oxide of Si;
wherein a percentage of the second minor component to 100 moles of the major component is in the range of 2 atomic %≦the second minor component<80 atomic % in terms of Ca;
wherein a percentage of the third minor component to 100 moles of the major component is in the range of 1 atomic %≦the third minor component<40 atomic % in terms of Si; and
wherein an atomic ratio of Ca to Si (Ca/Si) is not less than 1, and
wherein a composite oxide synthesized by a reaction between Ca and Si makes a second phase different from a first phase mainly containing zinc oxide, and the composite oxide is present at crystal grain boundaries of the zinc oxide.

* * * * *